United States Patent
Kurowski et al.

(10) Patent No.: US 9,522,520 B2
(45) Date of Patent: Dec. 20, 2016

(54) PROCESS FOR PRODUCING A MICROFLUIDIC APPARATUS AND RELATED LAMINATING DEVICES

(75) Inventors: Dirk Kurowski, Gevelsberg (DE); Oliver Paul, Gelsenkirchen (DE)

(73) Assignee: Boehringer Ingelheim Microparts GmbH, Dortmund (DE)

( * ) Notice: Subject to any disclaimer, the term of this patent is extended or adjusted under 35 U.S.C. 154(b) by 701 days.

(21) Appl. No.: 13/819,050

(22) PCT Filed: Aug. 30, 2011

(86) PCT No.: PCT/EP2011/064857
§ 371 (c)(1),
(2), (4) Date: May 10, 2013

(87) PCT Pub. No.: WO2012/028595
PCT Pub. Date: Mar. 8, 2012

(65) Prior Publication Data
US 2013/0240140 A1    Sep. 19, 2013

(30) Foreign Application Priority Data
Sep. 1, 2010    (EP) .................................... 10009072

(51) Int. Cl.
B32B 37/00    (2006.01)
B32B 37/30    (2006.01)
B01L 3/00    (2006.01)
F16K 99/00    (2006.01)

(52) U.S. Cl.
CPC .......... B32B 37/30 (2013.01); B01L 3/502707 (2013.01); B01L 3/502738 (2013.01); F16K 99/0001 (2013.01); F16K 99/0015 (2013.01); B01L 2200/12 (2013.01); B01L 2300/0816 (2013.01); B01L 2300/0887 (2013.01); B01L 2300/123 (2013.01); B01L 2400/0481 (2013.01); B01L 2400/0655 (2013.01); F16K 2099/008 (2013.01); Y10T 156/16 (2015.01)

(58) Field of Classification Search
CPC ............ B32B 37/00; B32B 37/30; B01L 3/00; B01L 3/502707; B01L 3/502738; F16K 99/0001; F16K 99/0015
See application file for complete search history.

(56) References Cited

U.S. PATENT DOCUMENTS

| | | | | |
|---|---|---|---|---|
| 5,376,252 A | * | 12/1994 | Ekstrom | ................ B01D 57/02 204/603 |
| 2006/0057030 A1 | | 3/2006 | Lee et al. | |
| 2011/0135546 A1 | * | 6/2011 | Kurowski | ......... B01L 3/502707 422/502 |
| 2013/0240140 A1 | | 9/2013 | Kurowski | |

FOREIGN PATENT DOCUMENTS

| | | | | |
|---|---|---|---|---|
| CA | 2726219 A1 | 12/2009 | | |
| DE | 10134040 B4 | 2/2003 | | |
| DE | EP 2138233 A1 | * 12/2009 | ........ | B01L 3/502707 |
| EP | 0055082 A2 | 6/1982 | | |
| EP | 2138233 A1 | 12/2009 | | |
| EP | 2210666 A1 | 7/2010 | | |
| GB | 2445738 | 7/2008 | | |
| WO | 9426414 A1 | 11/1994 | | |

OTHER PUBLICATIONS

International Search Report, Form PCT/ISA/210, for corresponding PCT/EP2011/064857; date of mailing: Nov. 25, 2011.

* cited by examiner

*Primary Examiner* — Michael N Orlando
*Assistant Examiner* — Matthew Hoover
(74) *Attorney, Agent, or Firm* — Michael P. Morris; Mary-Ellen M. Devlin

(57) ABSTRACT

A process and a laminating device for producing a microfluidic device are proposed, wherein a film is pressed onto a carrier under the effect of heat and thereby attached to it. During the attachment the film is lifted by the blowing in of gas on the carrier side to prevent it adhering in a non-attachment region and is vented on the remote side. The device is compressed between a holder and a thermode of the laminating device during the lamination. An elastic intermediate layer is arranged in each case between the device and the holder and between the device and the thermode, for evening out the contact pressure and obtaining uniform attachment of the film to the carrier.

13 Claims, 4 Drawing Sheets

PROCESS FOR PRODUCING A MICROFLUIDIC APPARATUS AND RELATED LAMINATING DEVICES

The present invention relates to a process and/or apparatus for producing an in particular microfluidic device, preferably for receiving or handling a fluid, such as a liquid, according to one or more of the disclosed and/or described embodiments.

The present invention is concerned with preferably microfluidic systems or devices. The following remarks relate particularly to devices in which capillary forces come into play and are particularly crucial for the operation. However, the present invention also relates to devices in which other forces are involved, e.g. centrifugal forces and/or compressive forces.

From WO 2008/071351 A1 and EP 2 138 233 A1, which form the starting point of the present invention, microfluidic devices are known with chambers particularly in the form of channels which are at least partially bounded by a three-dimensionally shaped film and are in particular elastically deformable or compressible. Chambers or channels of this kind can be used for holding and manipulating fluids, particularly liquids, particularly by carrying, mixing or conveying them. The three-dimensional shaping of the film is obtained by lamination onto an associated carrier, while the film is pressed onto the carrier under the effect of heat by a mask with a recess or cut-out, so that the film is not attached to the carrier in the region of the recess or cut-out, but bulges independently in a convex shape in this non-attachment region.

The lamination of the film onto the carrier is carried out in particular under the effect of pressure and/or heat and includes in particular so-called heat-sealing. The term "lamination" for the purposes of the present invention may, however, also theoretically include other forms of attachment of the film to the carrier, in particular only in parts, for example by adhesive bonding.

Precisely with microfluidic devices in which the film is only attached to the associated carrier in parts, it is important to achieve a very well-defined or uniform attachment in the desired region and/or to prevent adhesion of the film in certain non-attachment regions.

The aim of the present invention was therefore to provide a process for producing an in particular microfluidic device and a laminating device, wherein a well-defined or uniform attachment of the film to an associated carrier can easily be achieved and/or unwanted adhesion of the film to the carrier in a non-attachment region can easily be prevented.

The above aim is achieved by a process and/or apparatus in accordance with one or more of the disclosed and/or described embodiments.

In one aspect the invention sets out to assist or support the three-dimensional shaping of the film in the non-attachment region and/or to prevent the film adhering to the carrier in the non-attachment region by lifting the film in the non-attachment region during the lamination or attachment by blowing in gas from the carrier side and/or by venting the film in the non-attachment region during the lamination or attachment on the side remote from the carrier. A laminating device for carrying out this process or for attaching a film to a carrier is then embodied such that during the attachment the film is lifted in the non-attachment region by blowing in gas from the carrier side so as to prevent adhesion. Alternatively or additionally, the laminating device is embodied such that during the attachment the film is vented in the non-attachment region on the side remote from the carrier and/or a recess or cut-out in the mask that presses the film against the carrier is vented. In particular, venting is thus provided for the recess or cut-out in the mask. Thus the three-dimensional shaping of the film, particularly to form the convex chamber wall by means of the film, can be assisted or simplified. It should be mentioned in this context that the three-dimensional shaping is preferably at least substantially carried out exclusively or decisively by the lamination as such and not by an additional action such as blowing in gas or venting.

The blowing in or supplying of gas serves in particular only to raise the film briefly in order to prevent adhesion in the non-attachment region, but not to achieve the actual three-dimensional shaping of the film.

In another aspect the invention sets out to even out the contact pressure and/or the attachment of the film to the carrier, namely using an elastic intermediate layer which is arranged between the film and an associated thermode and/or between the carrier and an associated holder of the laminating device. The intermediate layer consists in particular of an elastomer. Thus a significant improvement when attaching the film to the carrier, i.e. during lamination, can easily be obtained. In particular, a substantially more uniform attachment of the film to the carrier can be ensured in this way.

Any unevenness or tolerances can be equalised. A more uniform contact pressure can be obtained accordingly.

According to another aspect of the present invention, the laminating device preferably comprises a vent for the recess or cut-out in the mask, so that during the attachment process the film is vented on the side remote from the carrier in the non-attachment region. This in turn helps with the three-dimensional shaping of the film.

Preferably, it is envisaged that a flat and/or non-preformed film is laminated onto a carrier (i.e. by the effect of heat and pressure) and a chamber wall three-dimensionally shaped or made convex purely by the lamination is formed from the film, partially defining a desired chamber between the film and the carrier. This provides a particularly simple manufacturing method.

For the lamination, in particular, a mask is pressed onto the film under the effect of heat using a so-called thermode (heated punch). The mask has at least one recess or cut-out, so that the film is not attached to the carrier in the region of the recess or cut-out—in the non-attachment region—preferably exclusively as a result of this, but is three-dimensionally shaped or structured in this region. In the other regions, however, the film is preferably firmly attached to the carrier in the usual way as a result of the lamination. Thus, it is very easy to carry out structuring or shaping of the film in order to form a three-dimensional structure such as a chamber for a fluid such as a liquid, particularly for holding and/or manipulating the fluid.

By the term "chamber" is meant, according to the present invention, in particular any three-dimensional structure—for example an elongate channel—that can be manufactured according to the proposed method or is bounded by the three-dimensionally formed or structured film and serves to receive liquid or another fluid, possibly also gas.

The present invention relates in particular only to microfluidic devices or structures or the manufacture thereof. By "microfluidic" are meant here in particular only volumes of the device as a whole or the chamber of less than 1 ml or less than 500 μl, preferably less than 100 μl, particularly preferably about 10 μl or less.

The aspects and features mentioned above and the aspects and features of the present invention that will become apparent from the following description may be implemented independently of one another and in any desired combination.

Further advantages, features, properties and aspects of the present invention will become apparent from the claims and the following description of preferred embodiments referring to the drawings, wherein:

Figure 1:
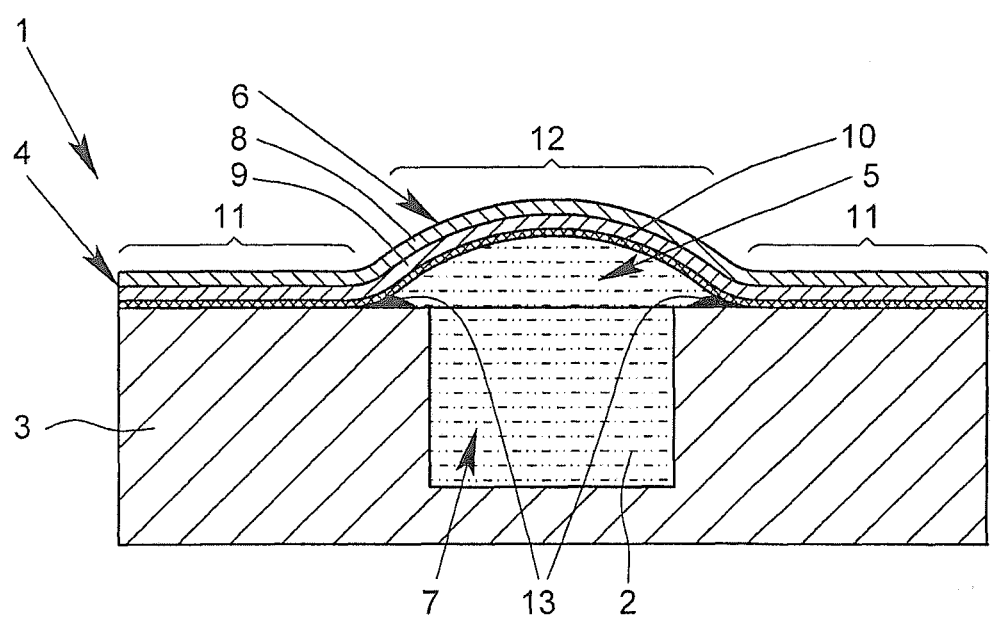
FIG. 1 is a schematic section through a device produced according to the proposal.

In the Figures the same reference numerals are used for identical or similar parts, while corresponding or comparable properties and advantages are obtained even if there is no repetition of the description. The Figures are not to scale, so as to illustrate various aspects and assist with understanding the description.

FIG. 1 shows, in a partial schematic plan view, a preferably microfluidic device 1 produced as proposed, particularly for the holding, analysis and/or manipulation of a fluid, preferably a liquid 2.

The device 1 comprises a carrier 3 and a film 4. Between the carrier 3 and the film 4 is formed a three-dimensional fluidic structure for receiving or manipulating the fluid. In particular, the structure is an oblong or hemispherical chamber 5 which is at least substantially channel-shaped, for example.

The structure or chamber 5 is at least partly defined by a chamber wall 6 which is formed in or by the film 4. In particular the carrier 3 is flat or planar at least in this region or the laterally adjacent surface region—with the exception of possible inlet or outlet pipes for the fluid—so that the structure or chamber 5 is substantially or virtually exclusively formed in the film 4 or outside the carrier 3 or above the flat side thereof.

However, the chamber 5 may also extend into the carrier 3. For example, the chamber 5 may be adjoined by a fluidic structure in the carrier 3, such as a channel 7, which is formed for example by a depression, recess or cut-out, or may be fluidically connected thereto, as shown in the embodiment. The chamber 5 then extends for example into the carrier 3 or is fluidically connected to other fluidic structures of the device 1 or carrier 3.

The carrier 3 is preferably made of plastics, particularly polystyrene, cyclo-olefin-polymer, cyclo-olefin-copolymer, polymethylmethacrylate or polycarbonate or produced by injection moulding.

The carrier 3 is preferably at least substantially plate-shaped, flat, planar and/or rigid in construction.

The film 4 preferably consists at least substantially of plastics.

The film 4 has a single- or multi-ply covering layer which, in the embodiment shown, may be formed by or made up of two film layers 8 and 9. The covering layer is made from a suitable material, for example polyethylene or polypropylene. The individual film layers 8 and 9 may be made of different materials.

The film 4 is preferably in the form of a so-called heat-sealing film. Therefore it preferably comprises a layer or coating 10 of hot-melt adhesive, so-called sealing lacquer or sealing film, or glue, particularly EVA, or the like. The film 4 can be bonded to the carrier 3 by means of the coating 10.

The sealing lacquer or adhesive or the like that forms the coating 10 preferably has a lower melting or softening point than the covering layer and/or the carrier 3 or its surface material, particularly about 70 to 170° C., preferably about 80 to 120° C.

The film 4 is laminated onto the carrier 3, particularly the flat side of the carrier 3, i.e. bonded to the carrier 3 under the effect of pressure and heat (preferably at about 70 to 170° C., particularly at about 80 to 120° C.). Heat-sealing is carried out, in particular. However, the film 4 may also be attached to the carrier 3 by some other suitable method, for example adhesive bonding or welding. The term "lamination" should therefore be interpreted suitably broadly.

Before the lamination, the flat film 4 is preferably neither pre-formed nor three-dimensionally structured or the like in order to form the three-dimensionally shaped and/or convex chamber wall 6. Rather, the film is first deformed or structured by the lamination so as to form the three-dimensionally shaped or convex chamber wall 6, particularly so as to make it convex or deform it away from the carrier 3, and/or particularly without the application of any pressure, e.g. gas pressure, to the chamber wall 6.

The three-dimensional deformation or convex shaping of the chamber wall 6 is preferably achieved or assisted by the fact that the material of the coating 10 is at least partly displaced from a pressing or connecting region 11 of the film 4 with the carrier 3 into a non-attachment region 12 (a region in which the film 4 is not attached to the carrier 3) or into the region of the chamber wall 6 or flows viscously therein, in particular so that a wedge of material 13 is formed in this transitional region between the chamber wall 6 and the carrier 3, as indicated in FIG. 1.

Instead of or in addition to the material or adhesive of the coating 10, it is also possible for an in particular viscous flow or shaping and/or displacement of material from the covering layer to take place, thereby forming the wedge of material 13.

The film 4 is thus pressed onto the carrier 3 in the attachment region 11 during the lamination and attached or bonded to the carrier 3—particularly over the entire surface—as a result of the simultaneous application of heat. In the non-attachment region 12, however, the film 4 is not pressed onto the carrier 3 or attached thereto.

Figure 2:
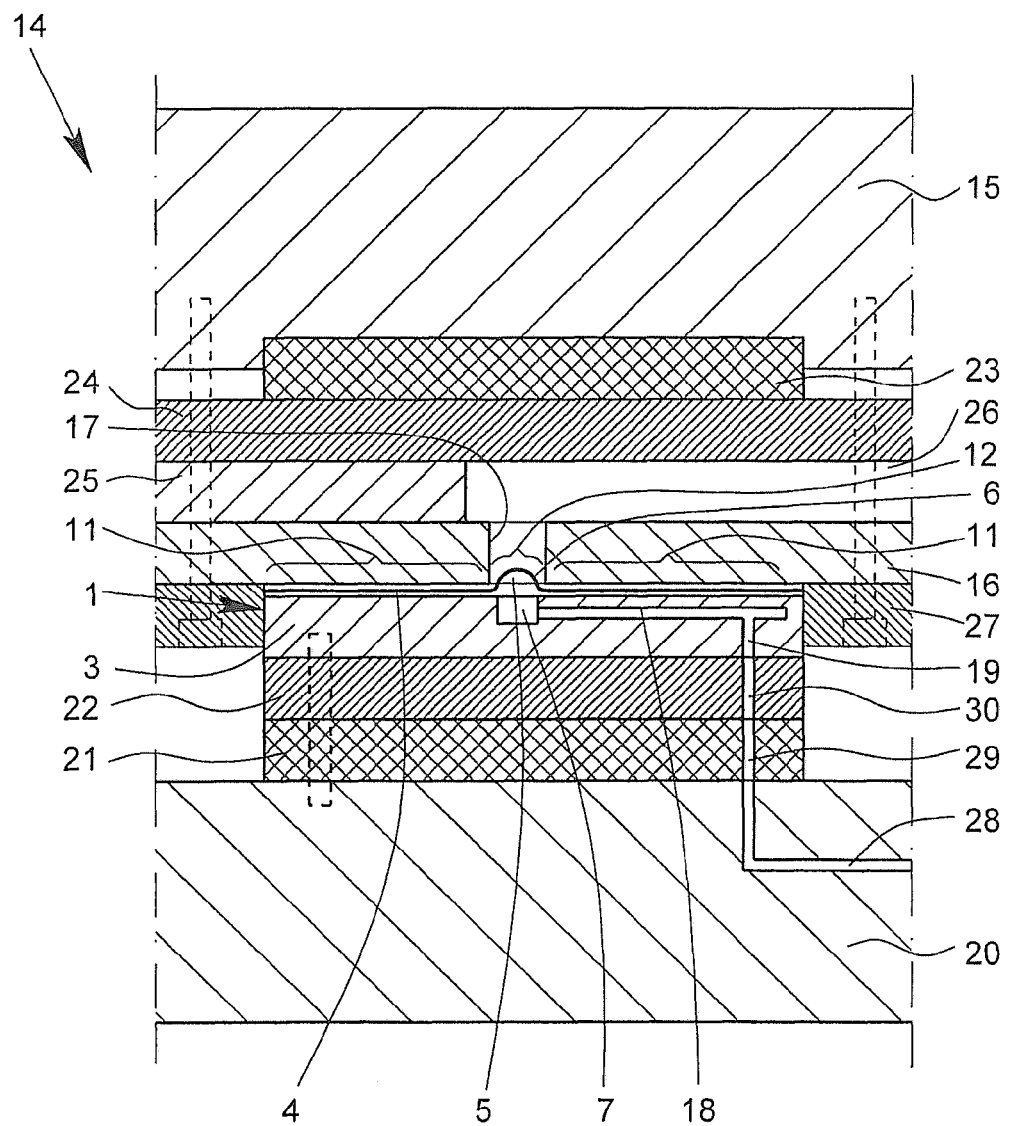
FIG. 2 is a schematic section through a laminating device according to the proposal for producing the device.

FIG. 2 shows, purely diagrammatically, the device 1 with the film 4 already laminated on, while the chamber wall 6 has already been three-dimensionally shaped or rendered convex.

Figure 3:
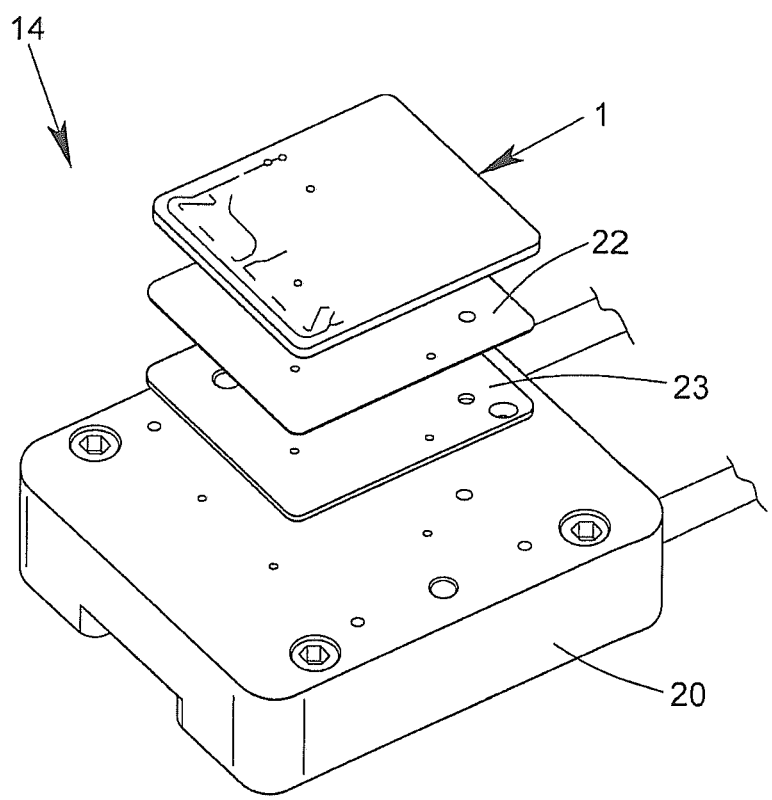
FIG. 3 is a perspective exploded view of a construction of the laminating device on the holder side.

A laminating device 14 of the kind proposed will now be explained with reference to the other Figures. FIG. 3 shows, in a schematic partial section, a preferred embodiment of the laminating device 14.

According to the proposal the lamination is carried out in particular with a heated punch or a so-called thermode 15 and particularly an associated mask 16, which is formed for example by the punch or the thermode 15 or a separate part or the like. If necessary, the mask 16 may also be formed by the surface of a roll or roller of a roller laminator or the like.

The mask 16 preferably has at least one recess or cut-out 17 in the non-attachment region, so that the film 4 is not pressed on in this region but is able to billow up into the mask 16.

For the lamination the mask 16 is pressed, under the effect of heat, onto the film 4 which is initially resting on the carrier 3, more particularly lying loosely thereon. This causes the film 4 to be attached to the carrier 3 preferably exclusively in the attachment region 11, but not in the non-attachment region 12; rather, it is three-dimensionally shaped or structured in this region 12, as shown in FIGS. 1 and 2. In fact, it has surprisingly been found that the film 4 is rendered convex without any additional deformation step and particularly without the use of an inflating agent, pressurised gas or the like in the region of the recess or cut-out 17 in the mask 16, thus forming the three-dimensionally shaped or structured chamber wall 6, as schematically shown in FIGS. 1 and 2.

It should be noted that the film 4 does not necessarily have to rest loosely. The proposed process can also be carried out with a film 4 that is adhering to some extent. This even has the advantage that fewer air bubbles are trapped during the lamination.

The proposed three-dimensional deformation of the film 4 may in particular be carried out as desired with a punch laminator or roller laminator (not shown).

The proposed lamination is very simple to carry out, in particular, as there is no need for any additional deforming steps. The mask 16 is very easy to manufacture as there is, in particular, no need for any three-dimensional structuring of the mask 16.

Rather, it is sufficient to form one or more recesses or cut-outs 17 with the desired contours.

The structure or chamber 5 formed in the film 4 as proposed is fluidically connected or attached for example via the channel 7 and other channels 18 and 19 of the device 1 or the carrier 3 or some other fluidic structure, a fluidic component or the like. In the embodiment shown, the channel 18 runs for example along the flat side of the carrier 3. It may be formed for example by a groove in the carrier 3, which is flatly covered in particular by the film 4. The channel 19 preferably extends perpendicularly thereto and/or open to the outside at its end, in this case for example on the flat side of the carrier 3 remote from the film 4.

The proposed device 1 forms in particular a microfluidic platform or a microfluidic system for holding or manipulating a fluid, such as the liquid 2.

In particular the chamber 5 or the chamber wall 6 is elastically or reversibly deformable. Its shape can be restored in particular by corresponding restoring forces in the film 4 or chamber wall 6 and/or by means of a fluid pressure prevailing in the chamber 5.

For the deformation, a part or element such as a punch, a roll, a roller, a slide, another actuator or the like may act on the chamber wall 6, for example. Thus, for example, a compression valve or a pump may be produced. An actuator or actuating mechanism may be produced alternatively or in supplementary manner by pressing or applying pressure directly or indirectly using a fluid (liquid or gas) to a wall or a valve or the like and/or by operating an actuator.

It should be noted that the device 1 constructed according to the proposal may be used for a variety of purposes, for example for particularly controlled aeration or venting, and in particular also combined with other, in particular microfluidic systems, components such as valves, pumps, capillary stops, filters, detecting devices or the like.

It should be noted that depending on the compression of the chamber 5 it is also possible to constrict the fluidic connection. The proposed device 1 can thus, in particular, be used not only as a valve but also as a constriction or other element for fluid manipulation.

Depending on the particular requirements the film 4 may also form a plurality of three-dimensionally shaped or convex chamber walls 6 of different chambers 5.

As already mentioned, the film 4 may also cover or form another fluidic structure or all the other fluidic structures in or on the carrier 3, such as a recess, a depression, a cut-out, a groove, channels and/or a plurality of chambers 5 or the like.

With regard to possible fluidic structures and/or configurations of the device 1, additional reference is made to the embodiments described in WO 2008/071351 A and EP 2 138 233 A1.

With regard to the materials that can be used for the carrier 3 and film 4, additional extensive reference is made to the relevant remarks in EP 2 138 233 A1.

With regard to the preferred adhesion values, the preferred values for the contact pressure and the preferred durations of the lamination or heat-sealing, additional reference is made to EP 2 138 233 A1 and the values specified therein. These preferably also apply to the present invention. The same can be said of the volumes and dimensions of the microfluidic structures or device 1 specified.

The laminating device 14 preferably has a holder 20 or other device for supporting the carrier 3. FIG. 3 shows in a perspective exploded view the construction of the laminating device 14 on the holder side, i.e. the holder 20, the first intermediate layer 21 and the first intermediate element 22, with the device 1.

Between the holder 20 and the carrier 3 there is preferably a first elastic intermediate layer 21. The intermediate layer 21 is formed in particular from a suitable plastic and/or is elastically yielding in the direction of compression, i.e. perpendicular to its flat surface or in the direction of thickness, in the embodiment shown. To rule out any adhesion of the first intermediate layer 21 to the carrier 3 and/or to exclude or minimise any sagging or other deformation of the carrier 3 during lamination, a first intermediate element 22 is preferably arranged between the first intermediate layer 21 and the carrier 3.

The first intermediate element 22 is embodied in particular as a thin plate, particularly preferably as a metal plate. The thickness is preferably less than 1 mm. The first intermediate element 22 preferably has sufficient stability to transmit or distribute forces. On the other hand the first intermediate element 22 is preferably sufficiently flexible to adapt to unevenness or different thicknesses.

Regarding the thermode 15 it should be mentioned that this is a preferably electrically or otherwise heated or heatable punch or the like.

The thermode 15 and the holder 20 are adjustable relative to each other, partly in order to press the film 4 against the carrier 3 by means of the mask 16 located thereon and thus be able to attach it thereto.

Between the thermode 15 and the mask 16 there is preferably a second elastic intermediate layer 23. The second layer 23, like the first intermediate layer 21, is preferably elastically yielding perpendicularly to its flat surface or direction of thickness. In particular, the second intermediate layer 23 also consists of a suitable plastics, fibre material or the like. The first and second intermediate layers 21 and 23 may be made from the same material or from different materials.

The thickness of the first and/or second intermediate layer 21, 23 is preferably about 0.5 to 5 mm, particularly preferably about 1 to 3 mm.

Between the second intermediate layer 23 and the mask 16 there is preferably a second intermediate element 24 which is preferably of similar construction to the first intermediate element 22. In particular, the second intermediate element 24 is also a metal plate. The second intermediate element 24, like the first intermediate element 22, also serves to distribute the pressing force and/or to adapt to different thicknesses or the like. However, on the thermode side or film side, between the second intermediate element 24 and the film 4, are provided both the mask 16 and also, preferably, a venting element 25 having at least one venting channel 26.

The intermediate element 22 and the second intermediate element 24 serve particularly to produce a flexible mask package which can adapt to differences in height or thickness, particularly to gaps, dips in the device 1 or carrier 3, wedge-shaped gaps or the like. Alternatively or additionally, the intermediate elements 22 and 24 also serve to cover the elastic intermediate layers 21 and 23 or elastomers that form these intermediate layers, more particularly as these would otherwise "flow" undesirably into adjacent recesses.

It is possible that the venting element 25 or the at least one venting channel 26 thereof is also formed in or by the mask 16. In this case the venting element 25 can be omitted. Alternatively, the mask 16, the venting element 25 and/or the second intermediate element 24 may also be joined together to form an assembly or unit.

The provision of at least one elastic intermediate layer 21, 23, preferably elastic intermediate layers on both sides of the device 1, one between the carrier 3 and the holder 20 and one between the thermode 15 and the mask 16, enables or provides or assists the equalisation of the contact pressure of the film 4 on the carrier 3 during the lamination and/or ensures a uniform attachment of the film 4 to the carrier 3. This contributes to the positive attachment of the film 4 to the carrier 3. Moreover this contributes to a defined formation of wedges of material 13 in the region of the chamber wall 6 and hence to a definite convexity of the chamber wall 6.

Figure 4:
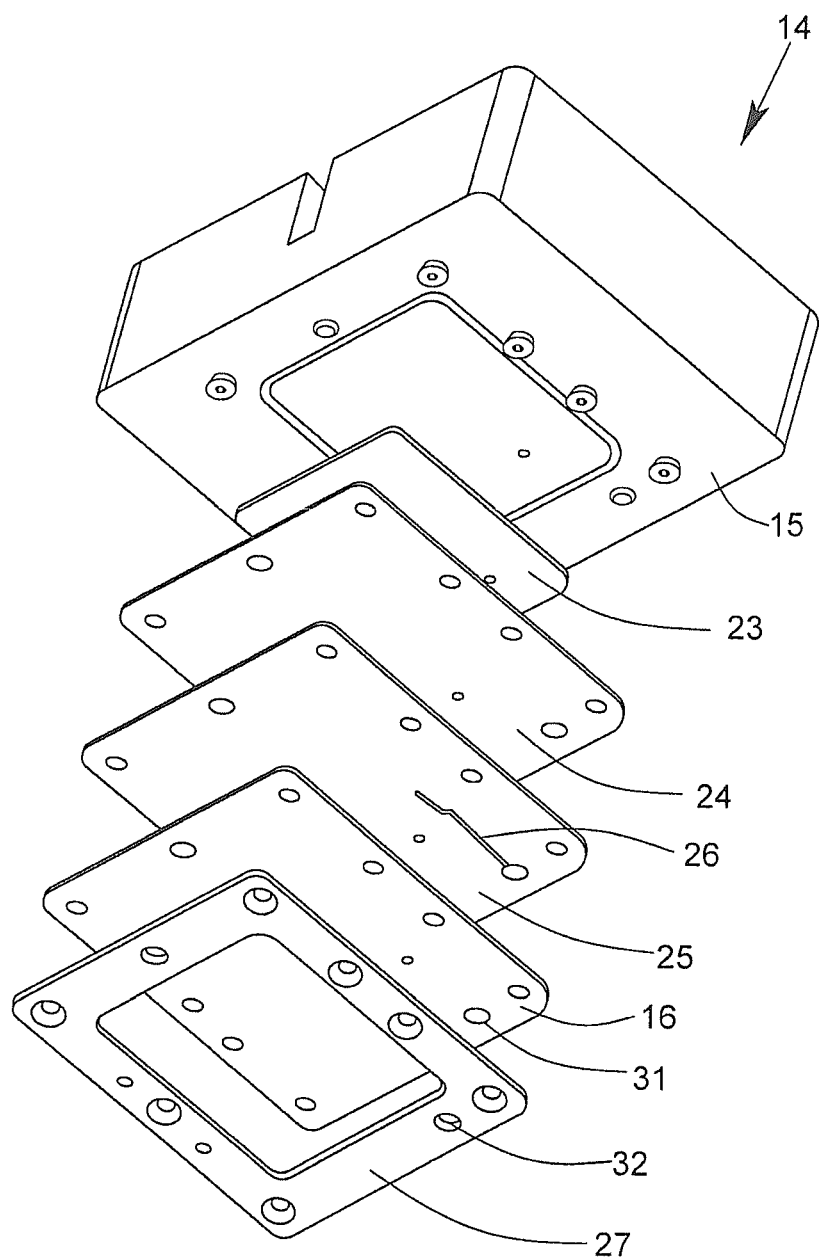
FIG. 4 is a perspective exploded view of a construction of the laminating device on the thermode side.

FIG. 4 shows in a perspective exploded view the preferred construction of the laminating device 14 on the thermode side, namely the thermode 15, the second intermediate layer 23, the second intermediate element 24, the venting element 25, the mask 16 and an optional, preferably frame-like holding element 27. By means of the holding element 27 the mask 16, the venting element 25, the second intermediate element 24 and the second intermediate layer 26 can be attached to the thermode 15, particularly in the manner of a package, for example using screws shown by dashed lines in FIG. 2 which attach the holding element 27 to the thermode 15. The screws pass through corresponding holes or guide openings in the mask 16, in the venting element 25 and in the second intermediate element 24, so that the latter are capable of moving and/or tilting relative to the thermode 15, in accordance with the deformation of the second intermediate layer 23.

The first intermediate element 22 is preferably also secured to be slidable or tiltable relative to the holder 20, for example by means of pins indicated by dashed lines, which extend from the holder 20 through corresponding guide openings or holes through the first intermediate layer 21 into the first intermediate element 22 and optionally also hold or guide the device 1 or the carrier 3 thereof to be slidable or adjustable in the direction of pressing.

The second intermediate layer 23 in the embodiment shown is preferably set somewhat into a suitable recess or depression of the thermode 15 and thereby guided laterally or held. However, other design solutions are also possible.

Instead of the screw guide on the thermode side and/or the pin guide on the holder side, other design solutions for suitable guidance and holding are also possible.

The use of the elastic intermediate layers 21 and 23 or the tiltable mounting of the pressing surfaces or at least one pressing surface, such as the mask 16, acting on the device 1 and/or the tiltable supporting of the carrier 3 lead(s) to an evening out of the contact pressure and/or to a more uniform attachment of the film 4 to the carrier 3, and this may also be carried out independently of any three-dimensional shaping of the film 4, i.e. generally during the lamination or the manufacture of microfluidic devices 1. A correspondingly constructed laminating device 14 can also be produced independently of the three-dimensional shaping of the film 4 or chamber wall 6.

As already mentioned, the attachment of the film 4 to the carrier 3—i.e. the lamination—is carried out in an attachment step in which the film 4 is pressed onto the carrier 3 under the effect of heat by means of the mask 16, thereby attaching the film 4 to the carrier 3 in the attachment region 11, but not in the non-attachment region 12 in the vicinity of the at least one recess or cut-out 17, while in particular the film 4 in the non-attachment region 12 is also three-dimensionally shaped by the lamination or pressing on or formation of at least one wedge of material 13.

Preferably, the film 4 is lifted, at least briefly or in pulses, during the attachment step or lamination by the blowing in of preferably inert gas, optionally also compressed air, on the carrier side, to prevent adhesion in the non-attachment region 12. This assists the three-dimensional shaping of the chamber wall 6, although the three-dimensional shaping is not carried out by the introduction of the gas but by the attachment step or the lamination.

For introducing the gas or blowing it in, the laminating device 14 or the holder 20 is preferably provided with a gas feed 28 for supplying gas to the carrier 3. Alternatively or additionally, the first intermediate layer 21 and/or the first intermediate element 22 comprises a gas conduit 29 or 30 for conveying gas to the carrier 3.

The gas is fed in, in particular, through channels 19, 18 and 7 that are provided in the carrier 3 in any case, or that are specially provided for this purpose, these channels being fluidically connected to the chamber 5 or the chamber wall 6 or the non-attachment region 12 of the film 4 on the carrier side.

Additionally or alternatively to the blowing in or supplying of gas mentioned above, particularly for lifting the film 4 in the non-attachment region 12, the film 4 is vented during the attachment step or generally on the side remote from the carrier 3 in the non-attachment region 12 or in the region of the recess or cut-out 17. This in turn helps with the three-dimensional shaping of the chamber wall 6. In particular, this can prevent a counter-pressure that would otherwise build up during the desired three-dimensional shaping or bulging of the chamber wall 6 during the lamination or attachment to the carrier 3.

Alternatively or additionally, a reduced pressure may be applied on the venting side. This may also assist with the lifting of the film 4 in the non-attachment region 12.

The supply of gas or air that is preferably provided does not have to come from below, as in the embodiment shown, but may also be from above, for example, i.e. on the thermode side, for example.

The above-mentioned venting is carried out in particular by venting the recess or cut-out 17 in the mask 16. The laminating device 14 thus preferably also comprises a vent for the recess or cut-out 17. In the embodiment shown this vent takes the form of the venting element 25 with at least one venting channel 26. The venting channel 26 is in contact with the recess or cut-out 17 on the one hand and the environment on the other hand. However, other design solutions are also possible here. For example, the venting may alternatively or additionally take place through the mask 16 and/or the second intermediate element 24. Alternatively or additionally, the venting may also take place through corresponding bores or cut-outs 31 and 32 in the mask 16 and the holding element 27, through which the venting channel 26 may be connected to the environment, as shown in the perspective view in FIG. 4.

Generally speaking, the various features, aspects and variants may also be combined with one another in any desired manner.

LIST OF REFERENCE NUMERALS 1 device
2 liquid
3 carrier
4 film
5 chamber
6 chamber wall
7 channel
8 film layer
9 film layer
10 coating
11 attachment region
12 non-attachment region
13 wedge of material
14 laminating device
15 thermode
16 mask
17 cut-out
18 channel
19 channel
20 holder
21 first intermediate layer
22 first intermediate element
23 second intermediate layer
24 second intermediate element
25 venting element
26 venting channel
27 holding element
28 gas feed
29 gas conduit
30 gas conduit
31 vent opening
32 vent opening

The invention claimed is:

1. A process for producing an in particular microfluidic device (1), the process comprising:
  pressing a film (4) onto a carrier (3) under the effect of heat by means of a mask (16) having at least one recess or cut-out (17), as a result of which the film (4) is attached to the carrier (3) in an attachment region (11), but not in a non-attachment region (12) in the vicinity of the at least one recess or cut-out (17), such that the film (4) is three-dimensionally shaped in the non-attachment region (12), and
  wherein during the pressing and the heating the film (4) is lifted by the blowing in of gas on the carrier side or by the venting in the non-attachment region (12) on the side remote from the carrier (3) to prevent attachment of the film (4) in the non-attachment region (12).

2. The process according to claim 1, wherein the lifting takes place only briefly or in pulses during the attachment step.

3. The process for preparing an in particular microfluidic device (1), according to claim 1, wherein:
  during the attachment step the film (4) is pressed onto the carrier (3) by a thermode (15) and an associated pressing surface or mask (16) under the effect of heat, as a result of which the film (4) is attached to the carrier (3), while the carrier (3) is supported by a holder (20) during the attachment step, and
  the method further comprising inserting a first elastic intermediate layer (21) between the carrier (3) and the holder (20) and/or inserting a second elastic intermediate layer (23) between the thermode (15) on the one hand and the pressing surface or mask (16) on the other hand, in each case for evening out the contact pressure and/or for attaching the film (4) to the carrier (3).

4. The process according to claim 3, wherein the gas is passed through the first intermediate layer (21) and/or that venting takes place through the second intermediate layer (23).

5. The process according to claim 3, wherein the first and/or second intermediate layer (21, 23) is made from or consists of plastics or an elastomer.

6. The process according to claim 1, wherein the attaching step is carried out by way of a laminating device (14), wherein the laminating device (14) comprises:
  a thermode (15) and the mask (16) for pressing the film (4) onto the carrier (3) under the effect of heat, and
  a holder (20) for supporting the carrier (3), wherein the film (4) is attached to the carrier (3) in the attachment region (11), but not in the non-attachment region (12) in the vicinity of the at least one recess or cut-out (17) in the mask (16) and at the same time the film (3) is three-dimensionally shaped in the non-attachment region (12),
  wherein the laminating device (14) is constructed so that during the attachment the film (4) is lifted by the blowing in of gas on the carrier side to prevent it adhering in the non-attachment region (12).

7. The method according to claim 6, wherein the holder (20) is provided with a gas feed (28) for supplying gas to the carrier (3).

8. The method according to claim 6, wherein the laminating device (14) comprises a first elastic intermediate layer (21) between the carrier (3) and the holder (20), for evening out the contact pressure and/or for attaching the film (4) to the carrier (3).

9. The method according to claim 8, wherein the first intermediate layer (21) comprises at least one gas conduit (29) for supplying gas to the carrier (3).

10. The method according to claim 8, wherein between the first intermediate layer (21) and the carrier (3) is arranged a first rigid and/or metallic intermediate element (22).

11. The method according to claim 6, wherein the thermode (15) or a venting element (25) arranged between the thermode (15) and the holder (20) comprises at least one venting channel (26) as the venting means.

12. The method according to claim 11, wherein the laminating device (14) comprises a second elastic intermediate layer (23) between the thermode (15) on the one hand and the pressing surface or mask (16) on the other hand, for evening out the contact pressure and/or for attaching the film (4) to the carrier (3).

13. The method according to claim 12, wherein the second intermediate layer (23) is arranged between the venting element (26) and the thermode (15).

* * * * *